Patented Sept. 22, 1925.

1,554,870

UNITED STATES PATENT OFFICE.

RALPH H. McKEE AND CARROLL M. SALLS, OF NEW YORK, N. Y.

PROCESS OF MAKING CHLOROSULPHONIC ACID.

No Drawing.   Application filed June 20, 1923.   Serial No. 646,658.

*To all whom it may concern:*

Be it known that we, RALPH H. McKEE and CARROLL M. SALLS, citizens of the United States, residing at New York, in the county of New York and State of New York, have invented certain new and useful Improvements in Processes of Making Chlorosulphonic Acid, of which the following is a specification.

This invention relates to processes of making chlorosulphonic acid, and more particularly to the manufacture of chlorosulphonic acid by means of a catalyst.

If known methods of making chlorosulphonic acid, sulphur trioxid is treated with dry hydrogen chlorid or dry hydrochloric acid is run into oleum and the resulting product distilled.

Theoretically, chlorosulphonic acid may be expected to be produced when sulphuryl chlorid is treated with sulphuric acid according to the following equation:

$$SO_2Cl_2 + H_2SO_4 = 2SO_3HCl$$

However, prior attempts to bring about this reaction has been unsuccessful even though the reverse reaction has been known for a number of years.

An object of the present invention is the provision of a simple method by means of which sulphuryl chlorid and sulphuric acid may be caused to react to produce chlorosulphonic acid.

In the present invention, we employ a catalyst, such as mercury, salts of mercury, and other catalysts of the same general type, such as antimony, tin or bismuth. The sulphuryl chlorid and sulphuric acid and the catalyst are mixed in the proper proportions and heated in a closed vessel to produce a homogeneous mixture, which is then distilled to separate the chlorosulphonic acid from the remaining sulphuryl chlorid, sulphuric acid and the catalyst.

In another form of the invention, the catalyst is placed in the sulphuric acid and a current of sulphuryl chlorid vapor passed through the hot acid. The resulting distillate is condensed and then redistilled and impurities separated from the chlorosulphonic acid formed.

In a typical embodiment of the invention, sulphuric acid of approximately 100 per cent strength is employed. The use of 100 per cent sulphuric acid is not essential, although preferred. If a weaker acid is used, there is a slight loss in the yield of chlorosulphonic acid due to its reaction with the water in the sulphuric acid to produce additional sulphuric acid and hydrochloric acid. 140 parts by weight of sulphuric acid and 100 parts of sulphuryl chlorid, together with 2.4 parts of mercury are heated in a closed vessel to a temperature of approximately 160° C. for a period of about 8 hours and the resulting homogeneous mixture is then distilled. This produces substantially 160 parts of chlorosulphonic acid, a trace of sulphuryl chlorid, and a residue of 75 parts of sulphuric acid containing the mercury added as a catalyst, largely in the form of mercuric sulphate. This residue may be employed in the next charge in place of a similar amount of sulphuric acid.

When sulphuryl chlorid vapors is employed, strong sulphuric acid containing from $\frac{1}{10}$ to $\frac{1}{2}$ per cent of its weight of mercury, is heated to a temperature between 200° C. to 300° C., and a current of sulphuryl chlorid vapor passed through the hot acid. The resulting distillate is condensed and then redistilled. The second distillate is condensed by a primary condenser. The uncondensed vapor contains sulphur dioxid, chlorine and sulphuryl chlorid. These vapors are passed into a cooled vessel carrying active carbon and the sulphur dioxid and chlorine are combined to form additional sulphuryl chlorid which may be reused in the process. While a temperature running from 200° to 300° C. may be employed, we have found that the best results are obtained when a temperature of substantially 250° C. is used. The higher the temperature, the higher the rate of reaction of the sulphuryl chlorid, but a higher temperature has the disadvantage that larger amounts of sulphur dioxid and chlorine are formed by the decomposition of the sulphuryl chlorid by heat. However, even at a temperature of 300° C., this discomposition is not excessive or sufficient to cause trouble in carrying out the process. The loss of catalyst is small from a commercial viewpoint, a small part of it distilling over with the chlorosulphonic acid.

In practicing the process, wherein sulphuryl chlorid vapor is added to hot sulphuric acid, the reaction may be carried out as a plant process of the continuous type by adding sulphuric acid from time to time to the heated kettle to replace the sulphuric acid that has been used up in the reaction.

As stated, other catalysts may be employed in place of mercury with nearly as good results. Among the mercury salts which may be employed are mercuric sulphate and mercuric chlorid and we have found that salts of antimony, tin or bismuth which are commonly used as catalysts may also be employed, but mercury and the mercuric salts are preferred to the other salts mentioned.

While we have described in detail the preferred practice of the process, it is to be understood that the details of procedure, and proportion of ingredients may be widely varied, and that known chemical equivalents may be employed in place of the materials mentioned, without departing from the spirit of the invention or the scope of the subjoined claims.

We claim:

1. The process of making chlorosulphonic acid which comprises heating sulphuryl chlorid and sulphuric acid in the presence of a catalyst.

2. The process of making chlorosulphonic acid which comprises heating sulphuryl chlorid and sulphuric acid in the presence of a mercury compound.

3. The process of making chlorosulphonic acid which comprises heating sulphuryl chlorid and sulphuric acid in a closed vessel in the presence of a catalyst.

4. The process of making chlorosulphonic acid which comprises heating sulphuryl chlorid and sulphuric acid in a closed vessel to a temperature of substantially 160° C. in the presence of a catalyst.

5. The process of making chlorosulphonic acid which comprises heating a body of sulphuric acid containing a catalyst, passing sulphuryl chlorid vapors into the heated acid and collecting the chlorosulphonic acid vapors formed.

6. The process of making chlorosulphonic acid which comprises heating a body of sulphuric acid containing a small quantity of a mercury compound, passing sulphuryl chlorid vapors into the heated acid and collecting the chlorosulphonic acid vapors formed.

7. The process of making chlorosulphonic acid which comprises heating a body of sulphuric acid containing a catalyst, adding sulphuryl chlorid thereto, heating the mixture to form chlorosulphonic acid vapors, and collecting the vapors formed.

8. The process of making chlorosulphonic acid which comprises heating a body of sulphuric acid containing a catalyst, adding sulphuryl chlorid to the body of sulphuric acid at intervals, and continuously collecting the vapors of chlorosulphonic acid formed.

9. The process of making chlorosulphonic acid which comprises heating sulphuryl chlorid and sulphuric acid in the presence of a catalyst, collecting the distillate, redistilling it and passing the vapors through carbon to cause the sulphur dioxid and chlorine present in said vapors to react and form sulphuryl chlorid.

10. The process of making chlorosulphonic acid which comprises heating a body of sulphuric acid containing a catalyst, adding sulphuryl chlorid to the heated acid, collecting the vapors of chlorosulphonic acid, condensing said vapors, redistilling said chlorosulphonic acid, and collecting the vapors to obtain substantially pure chlorosulphonic acid.

In testimony whereof, we affix our signatures.

RALPH H. McKEE.
CARROLL M. SALLS.